United States Patent [19]
Prinz et al.

[11] Patent Number: 5,207,371
[45] Date of Patent: * May 4, 1993

[54] METHOD AND APPARATUS FOR FABRICATION OF THREE-DIMENSIONAL METAL ARTICLES BY WELD DEPOSITION

[76] Inventors: Fritz B. Prinz, 5801 Northumberland St.; Lee E. Weiss, 6558 Darlington Rd., both of Pittsburgh, Pa. 15217

[*] Notice: The portion of the term of this patent subsequent to Jun. 30, 2009 has been disclaimed.

[21] Appl. No.: 737,229

[22] Filed: Jul. 29, 1991

[51] Int. Cl.$^5$ .................. B23K 28/02; B23P 15/00
[52] U.S. Cl. .................. 228/125; 219/76.14; 228/159; 164/46
[58] Field of Search .................. 228/119, 159, 125; 164/46; 219/76.1, 76.14, 76.15, 76.12, 73.11, 76.16

[56] References Cited

U.S. PATENT DOCUMENTS

| | | | |
|---|---|---|---|
| 1,755,038 | 4/1930 | Tition | 219/76.1 |
| 3,156,968 | 11/1964 | White, Jr. | 219/76.14 X |
| 3,550,259 | 12/1970 | Smith | 219/73.11 |
| 4,621,762 | 11/1986 | Bronowski | 228/119 |
| 4,665,492 | 5/1987 | Masters | 364/468 |
| 4,752,352 | 6/1988 | Feygin | 156/630 |
| 4,775,092 | 10/1988 | Edmonds | 228/222 |
| 4,838,337 | 6/1989 | Siemers | 164/46 |
| 4,842,186 | 6/1989 | Doyle et al. | 228/222 |
| 4,857,693 | 8/1989 | Rump | 219/76.14 X |
| 4,894,505 | 1/1990 | Malone et al. | 228/222 |
| 5,126,529 | 6/1992 | Weiss et al. | 164/46 X |

FOREIGN PATENT DOCUMENTS

0322257 6/1989 European Pat. Off. ............... 39/42

OTHER PUBLICATIONS

"A Rapid Tool Manufacturing System Based on Stereolitography and Thermal Spraying" by Lee E. Weiss, E. Levent Gursoz, F. B. Prinz, Paul S. Fussell, Swami Mahalingham and E. P. Patrick published by the American Society of Mechanical Engineers, 1990, pp. 40–48.

"DC Arc Plasma-The Future in The P/M Industry?" by Douglas H. Harris, published by ASP Materials, Inc., Dayton, Ohio.

Microwave Materials and Devices, J. K. Dillion, Jr., Chairman, "Polycrystalline Ferrite Films for Microwave Applications Deposited by Arc-Plasma" by D. H. Harris, R. J. Janowiecki, C. E. Semler, M. C. Willson and J. T. Cheng published in the Journal of Applied Physics, vol. 41, No. 2, Mar. 1, 1970.

"Three Dimensional Printing: Ceramic Tooling and Parts Directly from a CAD Model" by Emanuel E. Sachs, Michael Cima, James Cornie, David Brancazio and Alan Curodea submitted to the National Rapid Prototyping Conference, Dayton, Ohio, Jun. 4–5, 1990.

"Automated Fabrication of Net Shape Microcrystalline and Composite Metal Structures Without Molds" by David Hauber, pp. 416–566, published in Manufacturing Processes, Systems and Machines, 14th Conference on Production Research and Technology, National Science Foundation, Ann Arbor, Michigan, Oct. 6–9, 1987.

*Primary Examiner*—Kenneth J. Ramsey
*Attorney, Agent, or Firm*—Buchanan Ingersoll

[57] ABSTRACT

In a method and apparatus for forming a three-dimensional object, successive layers of metal are welded together to build the object. After each layer is formed a complementary material is placed adjacent the layer. In this manner, layers of material form a block of welded metal and complementary material. Then, all or a portion of the complementary material which serves as a support structure during forming can be removed. The welded layers are milled to a final shape either after each layer is formed or after all layers have been made. Existing CNG machines can be easily modified to practice the method.

21 Claims, 1 Drawing Sheet

METHOD AND APPARATUS FOR FABRICATION OF THREE-DIMENSIONAL METAL ARTICLES BY WELD DEPOSITION

FIELD OF THE INVENTION

The invention relates to a method and apparatus for creating a three-dimensional object by welding successive layers of metal.

BACKGROUND OF THE INVENTION

Several methods have been proposed and utilized for creating three-dimensional objects by the incremental material build up of thin layers. These processes include lamination, selective laser sintering, ballistic powder metallurgy, three-dimensional printing, stereolithography and near net thermal spraying. Lamination involves the simple process of cutting layers of a selected material and then bonding those layers together. The layers may be pre-cut to shapes corresponding to a cross section through the article to be created. Alternatively, standard shapes of material can be stacked and bonded together. Then, the assembled structure is cut or machined to produce the desired shape. In U.S. Pat. No. 4,752,352, Michael Feygin proposes a computer controlled method and apparatus for forming a laminated object. He provides a supply station, a work station for forming a material into a plurality of layers for lamination, an assembly station for stacking the layers in sequence into a three-dimensional object, a station for bonding the laminations to complete the formation of the three-dimensional object and a control station. In his patent, Mr. Feygin discloses a method in which the laminations are cut from a roll of material, lifted, stacked and bonded under the direction of a computerized controller. The layers are bonded together by adhesive or brazing. This and other lamination techniques have several disadvantages. First, the bond between layers is critical and limits the strength of the object. Second, creation of each layer of the laminate also results in the production of significant amounts of waste materials. Finally, lamination is suitable for only those materials which can be formed into thin layers which can be bonded together.

In laser sintering, a laser is used to cure a starting material into a certain configuration according to the manner in which the laser is applied to that material. Products formed with this method are porous. Stereolithography is a more recent yet similar process which creates plastic prototype models directly from a vat of liquid photocurable polymer by selectively solidifying it with a scanning laser beam. An example of this method is described in European Patent 322 257. Both of these methods require a substantial amount of curable raw material. In both cases the laser must be carefully controlled to achieve the desired shape. In some applications, the laser typically does not fully cure each cross section. Rather, the laser cures the boundary of a section and then cures an internal structure or honeycomb that traps the uncured fluid. Thereafter, the article must be subjected to final curing under separate ultraviolet lights or heat treatment. Additional post processing, such as careful sanding and grinding, is required for making smooth, accurate surfaces.

In ballistic powder metallurgy beams of particles are directed to the coordinates of a three-dimensional object in a three-dimensional coordinate system. A physical origination seed to which the particulate matter is attracted is required. The process may use a beam of particles directed to the origination seed which builds the particles upward from that seed. Alternatively, one can use an energy beam which attracts the particulate matter already in the environment to the seed or another coordinate. Such a system is disclosed by William E. Masters in U.S. Pat. No. 4,665,492. This method cannot be used to make objects having undercuts therein without creating support structures at the same time. Normally, the support structures are created with the particle beam during the creation of the object. Such support structures must be removed by cutting, grinding or machining.

Three-dimensional printing is another technique similar to ballistic powder metallurgy. One variation of this technique creates layers of particles to produce a three-dimensional image in much the same manner that an ink jet printer produces two-dimensional images. The technique relies upon thermal shock or drop on demand material delivery techniques. A thermal shock technique forms a particle by vaporizing a small area of the fluid directly behind the nozzle. The drop on demand nozzle includes a piezo electric element to constrict the cavity thereby forcing a drop past the nozzle plate. In both instances the material is directed to a work surface in a manner to build up the article. This technique can only be used for certain kinds of materials and produces porous products.

In another variation of three-dimensional printing a series of two-dimensional layers are created by adding a layer of powder on top of a work surface. The powdered layer is selectively joined where the part is be formed by ink jet printing of a binder material. The work surface is then lowered and another layer of powder is spread out and selectively joined. The layering process is repeated until the part is completely printed. Following a heat treatment the unbonded powder is removed leaving the fabricated part. Although this technique has been proposed for metal, ceramic and plastic materials, it is limited to those materials to which a reliable binder can be applied and produces porous products.

Yet another method which has been proposed for forming metal articles is DC arc-plasma spraying. In this process a plasma is generated between to concentric water cooled electrodes which form a chamber into which an inert gas is injected. Fine metal particles are injected into the plasma by means of a mechanical feeder and carrier gas. The particles are sprayed onto a substrate by the plasma torch.

None of the just described layered fabrication techniques have been successfully used to make quality steel parts. Of the previously described layering processes only laser sintering and ballistic particle manufacturing have been proposed for steel part fabrication. However, objects made from laser sintering are porous. Such porosity is not acceptable for most metal parts. Ballistic particle manufacturing utilizes a particle beam. It is difficult to define the beam cross-section to acceptable levels of accuracy. The products made with this method generally have internal weakness caused by porosity and weak bonds.

Metal tubular shapes have been made by shape melting. Shape melting is a process whereby structural components are manufactured by depositing weld material layer-upon-layer until the desired geometry is achieved. Weld build-up operations like Shape Melting require a preform which is generally a machined piece of metal onto which the first layer of the build-up is deposited. It is termed a "preform" because its form and machined shape reflects an intended final shape of the build-up. A preform serves as the support for the molten as-deposited weld metal, as the conduit for conduction cooling of the freshly deposited weld metal, as the means for restraining weld contraction stresses thereby limiting distortion of the build-up, and as the general cross-sectional shape for the weld build-up, e.g., a cylindrical build-up would require a cylinder in the starting preform.

All of the described prior art techniques require expensive and sometimes custom-made motion control equipment. None are adaptable for use on existing metal forming or fabricating equipment such as computer numerical controlled (CNC) machines.

The art has attempted to make objects by spraying layers of metal on a substrate. Bonding between layers is often questionable. The layer interfaces are often weak points in the object. The interface between the substrate and the first layer is also weakly bonded in many articles. Problems have occurred in that the layers have tended to camber and possibly to peel apart from the substrate. Therefore, one must have a release agent or compatible substrate.

There is a need for a method and apparatus to manufacture quality metal parts by incremental build-up of material. The method and apparatus should be capable of producing articles having undercuts and irregular shapes. The method and apparatus should also be usable with existing equipment.

BRIEF DESCRIPTION OF THE INVENTION

We provide a method and apparatus to manufacture a three-dimensional object by incremental material build up of thin layers. Each layer is composed of two portions. A first portion represents a cross sectional slice of the three dimensional object being built. The second portion is the complement of the object shape of the first portion and serves as a structure which supports the growing object form. Both portions are built on a substrate. The first portion is formed by welding successive layers of metal to build the article. The second portion is a complementary material which can be applied by spraying, for example. Each welded layer corresponds to a cross section through an article such that there is at least one layer for every parallel cross section normal to a center line through the article. Complementary material is placed adjacent each layer after it is formed. The layers are milled to a final dimension either after all layers have been formed or individually before a successive layer is formed thereon. Hereinafter, we will use the term milled and milling to encompass all techniques involving use of a tool to remove material including use of a grinding wheel or a cutting wheel. After a layered structure is built up which contains the object made of the welded material surrounded by the complementary material, the complementary material is then removed leaving the created object. The complementary material can easily be removed by chemical etching or machining. If the complementary material is sufficiently brittle, all or most of it can be easily broken away.

Other objects and advantages of the invention will become apparent in connection with the description of the preferred embodiments shown in the following figures in which comparable parts carry the same reference numerals.

DESCRIPTION OF THE PREFERRED EMBODIMENTS

Figure 1:
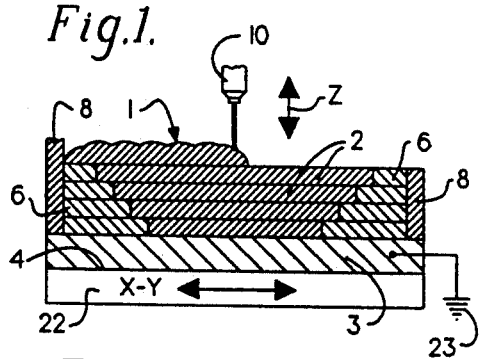
FIG. 1 is a cross-sectional view of an article being created on a substrate using a first preferred embodiment of our method.
Figure 2:
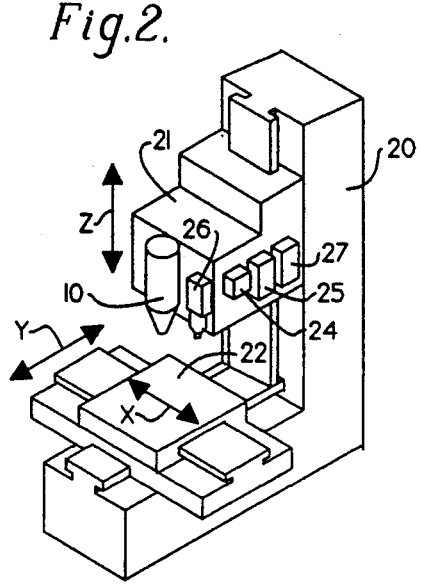
FIG. 2 is a diagram showing a present preferred embodiment of our apparatus for making three-dimensional objects using our method.

In FIG. 1 we show an article 1 which can be manufactured in accordance with our method and apparatus. This article is formed from several layers 2 welded together on a substrate 3 placed on a work surface 4. Iron-based alloys, nickel based alloys, aluminum-based alloys and titanium based alloys can be used to form the layers 2. To make the object of FIG. 1 we use a weld head 10 which can be attached to a CNC machine 20 as shown in FIG. 2. The work surface 4 is a table 22 that is capable of moving in two or three directions as indicated by arrows x, y and z. The weld head 10 is attached to a head 21 of a CNC machine 20. Such heads are normally movable in a vertical plane as indicated by the z arrow. In some machines the head is also movable in the x and y directions. The head 21 is designed to hold cutting tools (not shown) for cutting a workpiece (also not shown) on table 22. To make the article we place or form a substrate 3 on the work table 22. The substrate 3 should be made of a conductive material to which one can weld. The substrate could be the weld metal. The substrate 3 is connected to a ground 23. Then, the weld head 10 can be used to electrically arc weld a metal which is fed onto the substrate. If desired, more than one metal could be used to produce an article. Preferably the metal is in the form of welding rods or weld wire which can be automatically fed to a position under the weld head from supply 24. The table 22 or head 21 is moved in a manner to direct the delivery of the metal being welded in a predetermined pattern to form each layer 2. A complementary material is placed adjacent each layer by spray gun 26. Other techniques could also be used to place the complementary material. Such techniques include thermal sprays, delivery of the complementary material in a carrier such as an air stream or liquid slurry, feeding the complementary material from a gravity feed device, and use of a manual device such as a hand sifter to place the material by hand. After each layer is completed, work table 22 is dropped to allow for deposition of the next layer. Although we prefer to move the weld head 10 and spray gun 26 during formation of each layer one could also use a fixed spray gun and move the work surface 22.

If the complementary material 6 is applied in a liquid or powder form, it is desirable to provide a frame 8 around the article 1 being formed. This frame could be made of the same material as the article and welded in place using the same technique as is used to from the article 1.

Figure 3:
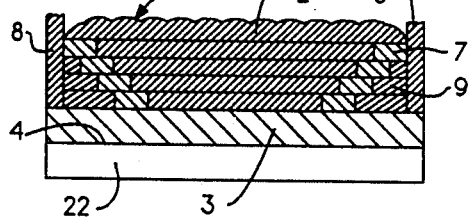
FIG. 3 is a cross sectional view of the block of an article being created using alternative preferred embodiments of our method.

As shown in FIG. 3 it may be desirable to extend the frame into the area 9 adjacent the frame. In that event, complementary material would only be placed in the area 7 adjacent the articles. In other circumstances one may wish to apply the complementary material in powder form and bond only that portion of the complementary material adjacent the article. In that event area 7 in FIG. 3 would be bonded complementary material and area 9 would be powdered complementary material. The complementary material could be bonded by selective heating techniques or by addition of a binder or catalyst.

The art has observed in some metal spray processes that residual stress develops in the sprayed metal layer causing the layer to camber and possibly to peel. To relieve the stress the art has shot peened such layers. The technique is only successful in situations where shot is evenly applied over the layer. Since our layers are flat, we can use this technique. Therefore, we prefer to provide a shot penner 25 for shot peening each layer.

It is also possible to relieve the stress by induction heating. Therefore, we alternatively provide an induction heater 27 which we move over each layer to selectively heat the surface. Such heating is easier to accomplish on flat layers rather than on curved and irregular surfaces.

Upon completion of the process, one will have a block of material. Because we have deposited a complementary material 6 with the deposition material, we are able to create intricate shapes and parts having undercut portions. For the particular object of FIG. 1, the complementary material 6 in each layer supports the ends of the welded material above that layer. We prefer that the complementary material have either very high electrical conductivity, such as copper, or very low electrical conductivity, such as ceramics. These types of material will not generate or retain significant amounts of heat. We also prefer to use a brittle material such as most ceramics. If that type of material is used the complementary material 6 can be easily broken away from the object 1 by vibration, ultrasonic vibration and heating of the article to cause thermal expansion of the article. We have found that if the article is to be fabricated in steel or other metal alloy most ceramics, copper and copper alloys make a suitable complementary material. We have found that ceramic comprised of 60% Fascote Refractory and 40% Fastcote Binder works well as a complementary material. These products are sold by the Ransom and Randolph Division of Dentsply International.

Figure 7:
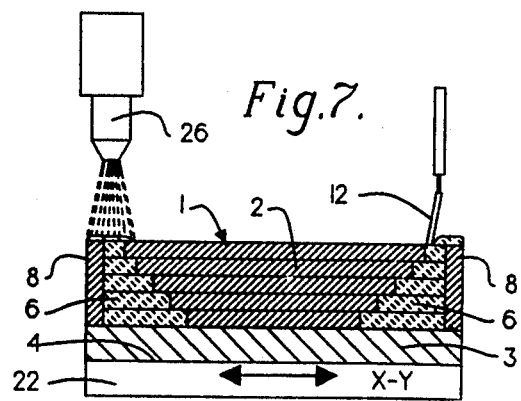
FIG. 7 is a cross-sectional view showing placement of complementary material adjacent to each layer.

As shown in FIG. 7 the complementary material can be sifted, blown or sprayed over each layer of welded metal filling in the region adjacent to the just welded metal as well as covering the top of each layer 2. Then squeegee 12 is drawn across the layer to remove excess material. Alternatively, one could cure the ceramic and mill away excess material.

Figure 4:
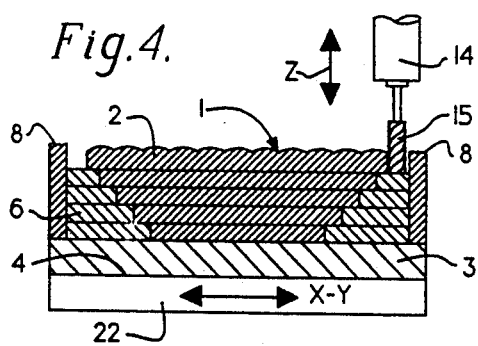
FIG. 4 is a cross-sectional view of an article being made with our method showing the edge of a layer being milled.
Figure 5:
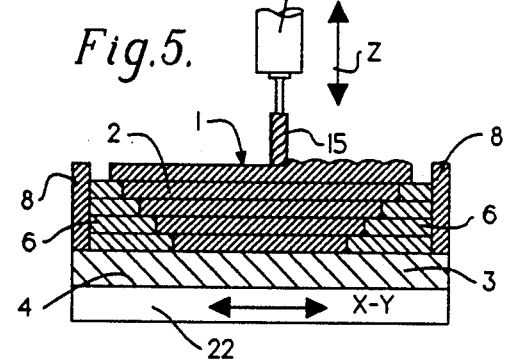
FIG. 5 is a cross-sectional view of an article being made with our method showing the top of a layer being milled.
Figure 6:
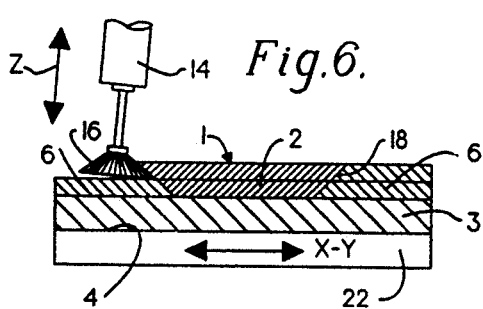
FIG. 6 is a cross-sectional view of an article being made with our method showing the article being contoured to a desired shape.

We further prefer to provide a milling head or a grinding wheel 14 (or a combination of these) as shown in FIGS. 4, 5 and 6. In FIG. 5 this head 14 passes over each layer trimming that layer to an exact thickness. The process is then repeated for each layer until the final block of material is produced. In FIGS. 4 and 6, the mill head 14 having tools 15 or 16 is used to shape the periphery of each layer 2. One could contour the article to any desired configuration through the use of appropriately shaped tools. Beveled tool 16 is used to produce a sloped side rather than a vertical edge as is made with tool 15. Moreover, one could make an article having an irregular configuration which might include undercuts and overlaps. In some applications it may be desirable to mill the article after it has been completely formed.

The solid-freeform fabrication system disclosed here would also permit the fabrication of complete functional assemblies containing two or more mating parts in one process without the requirement of discrete assembly operations. For example, the article 1 in FIG. 1 could be formed in the shape of a ball head and the frame 8 could be formed as a ball socket. After forming, the complementary material 6 is removed leaving a ball joint.

As can be seen from FIG. 2, our method can be followed using a CNC machine modified to include a weld head. Welding rod, weld wire and complementary material could be automatically or manually supplied. Even if the method is fully automated into a CNC machine, the cost of modifying such a machine is substantially less than the capital costs for other automated equipment for making articles by incremental build up of thin layers.

Because our layers are formed by welding there will be perfect fusion bonding between layers. As a result the object formed by our method will have high density and metallic bonds.

While we have described certain preferred embodiments of our apparatus and method, it should be distinctly understood that our invention is not limited thereto, but may be variously embodied with the scope of the following claims.

We claim:

1. A method for fabrication of a three dimensional metal article comprising the steps of
   a) positioning a substrate in a work area;
   b) welding successive layers of metal onto the substrate each layer corresponding to a cross section through the article;
   c) placing successive layers of a complementary material so that the complementary material is adjacent to each layer of metal;
   d) removing the complementary material; and
   e) removing the substrate.

2. The method of claim 1 also comprising the step of milling a plurality of the successive layers.

3. The method of claim 2 wherein each layer is contoured such that at least a portion of the article does not have a vertical edge.

4. The method of claim 1 wherein at least one layer is milled before a successive layer is welded thereon.

5. The method of claim 1 wherein at least one of the complementary material and the substrate are removed by etching.

6. The method of claim 1 wherein at least one of the complementary material and the substrate are removed by one of milling, vibration, ultrasonic vibration and thermal expansion of the article.

7. The method of claim 1 wherein the complementary material has one of very high electrical conductivity and very low electrical conductivity.

8. The method of claim 7 wherein the complementary material is one of a ceramic, a cermet, copper and copper alloys.

9. The method of claim 1 wherein the deposition material is at least one of an iron-based alloy, a nickel-based alloy, an aluminum-based alloy and a titanium based alloy.

10. A method for the fabrication of a three dimensional metal article comprising the steps of
   a) positioning a substrate in a work area;
   b) welding successive layers of metal onto the substrate each layer corresponding to a cross section through the article;
   c) placing a complementary powder so that a portion of the powder is near the successive layers and bound together into a mass adjacent the successive layers and another portion of the powder is not bound together;
   d) removing the complementary material; and
   e) removing the substrate.

11. The method of claim 10 also comprising the step of hardening at least a portion of the complementary powder.

12. The method of claim 11 wherein at least a portion of the complementary powder is hardened by one of adding a binder, using a catalyst and applying heat.

13. The method of claim 10 also comprising the step of placing a frame around the successive layers such that the complementary powder can be placed between the frame and the successive layers.

14. The method of claim 1 wherein at least two different materials are used for the welded layers.

15. The method of claim 1 also comprising the step of skimming away excess complementary material.

16. The method of claim 1 wherein the complementary material is applied with at least one of a spray source, a gravity feed device and a manually operated device.

17. The method of claim 1 also comprising the step of shot peening at least a portion of the successive layers.

18. The method of claim 1 also comprising the step of heating at least a portion of the successive layers.

19. A method for the fabrication of a three dimensional metal article comprising the steps of
   a) positioning a substrate in a work area;
   b) welding successive layers of metal onto the substrate each layer corresponding to a cross section through the article;
   c) placing a complementary material so that the complementary material is adjacent to each layer of metal;
   d) skimming away excess complementary material;
   e) removing the complementary material; and
   f) removing the substrate.

20. A method for the fabrication of a three dimensional metal article comprising the steps of:
   a) positioning a substrate in a work area;
   b) welding successive layers of metal onto the substrate each layer corresponding to a cross section through the article;
   c) using one of a spray source, a gravity feed device and a manually operated device to place a complementary material so that the complementary material is adjacent to each layer of metal;
   d) removing the complementary material; and
   e) removing the substrate.

21. A method for the fabrication of a three dimensional metal article comprising the steps of
   a) positioning a substrate in a work area;
   b) welding successive layers of metal onto the substrate each layer corresponding to a cross section through the article;
   c) placing successive layers of a complementary material so that the complementary material is adjacent to each layer of metal;
   d) shot peening at least a portion of the successive layers of metal;
   e) removing the complementary material; and
   f) removing the substrate.

* * * * *

UNITED STATES PATENT AND TRADEMARK OFFICE
CERTIFICATE OF CORRECTION

PATENT NO. : 5,207,371
DATED : May 4, 1993
INVENTOR(S) : FRITZ B. PRINZ, LEE E. WEISS

It is certified that error appears in the above-identified patent and that said Letters Patent is hereby corrected as shown below:

Column 7, line 22, claim 10, change "material" to --powder--.

Signed and Sealed this

Fourth Day of January, 1994

Attest:

BRUCE LEHMAN

*Attesting Officer*  *Commissioner of Patents and Trademarks*